US012138675B2

(12) United States Patent
Thaddaeus et al.

(10) Patent No.: US 12,138,675 B2
(45) Date of Patent: Nov. 12, 2024

(54) ADJUSTABLE BALANCING BLOCK FOR CLOSED LOOP DIE CONTROL

(71) Applicants: Sunil Thaddaeus, Greenville, SC (US); Patrick Henri, Ajax (CA)

(72) Inventors: Sunil Thaddaeus, Greenville, SC (US); Patrick Henri, Ajax (CA)

(73) Assignee: MAGNA INTERNATIONAL INC., Aurora (CA)

( * ) Notice: Subject to any disclaimer, the term of this patent is extended or adjusted under 35 U.S.C. 154(b) by 197 days.

(21) Appl. No.: 17/790,976

(22) PCT Filed: Dec. 31, 2020

(86) PCT No.: PCT/US2020/067611
§ 371 (c)(1),
(2) Date: Jul. 6, 2022

(87) PCT Pub. No.: WO2021/141819
PCT Pub. Date: Jul. 15, 2021

(65) Prior Publication Data
US 2023/0039349 A1 Feb. 9, 2023

Related U.S. Application Data

(60) Provisional application No. 62/958,861, filed on Jan. 9, 2020.

(51) Int. Cl.
*B21D 22/22* (2006.01)
*B21D 22/02* (2006.01)
(Continued)

(52) U.S. Cl.
CPC ............ *B21D 22/22* (2013.01); *B21D 22/02* (2013.01); *B30B 15/08* (2013.01); *B30B 15/26* (2013.01)

(58) Field of Classification Search
CPC ........ B21D 22/02; B21D 22/22; B21D 24/10; B21D 24/04; B21D 37/10
See application file for complete search history.

(56) References Cited

U.S. PATENT DOCUMENTS 6,018,979 A 2/2000 Davis
10,786,842 B2 * 9/2020 Zhou .................... B21D 24/005
(Continued)

FOREIGN PATENT DOCUMENTS

DE 10331939 A1 2/2005
DE 102006031438 A1 1/2008
(Continued)

*Primary Examiner* — Teresa M Ekiert
(74) *Attorney, Agent, or Firm* — Dickinson Wright PLLC

(57) ABSTRACT

A stamp tool assembly is provided that includes a forming cavity for shaping a blank into a formed part. The stamp tool assembly includes adjustable block assembly for modifying the amount of material draw-in from subsequently stamped blanks. A draw-in sensor measures the amount of material from the blanks that is not drawn-into the forming cavity during each stroke. Based on the readings from the draw-in sensor, the adjustable block assembly is expanded or reduced. The adjustable block assembly includes a pair of opposing inclined plates having interlocking teeth such that movement of one plate with respect to the other plate changes a vertical extension of the adjustable block assembly. The adjustable block assembly sets the spacing between two opposing draw-in surfaces, which, in turn, changes the amount of draw-in. Multiple adjustable block assemblies and draw-in sensors may be used in conjunction and controlled via a controlling system.

10 Claims, 20 Drawing Sheets

(51) Int. Cl.

| | |
|---|---|
| ***B30B 15/08*** | (2006.01) |
| ***B30B 15/26*** | (2006.01) |

(56) References Cited

U.S. PATENT DOCUMENTS

| | | | | |
|---|---|---|---|---|
| 2007/0183032 | A1 | 8/2007 | Michimori et al. | |
| 2017/0252792 | A1 | 9/2017 | Krönauer et al. | |
| 2019/0009322 | A1 * | 1/2019 | Schleich ................ | B21D 24/04 |

FOREIGN PATENT DOCUMENTS

| | | | |
|---|---|---|---|
| DE | 102015012795 | A1 | 4/2017 |
| EP | 3012038 | A1 | 4/2016 |
| FR | 3029437 | A1 | 6/2016 |

* cited by examiner

ADJUSTABLE BALANCING BLOCK FOR CLOSED LOOP DIE CONTROL

CROSS-REFERENCE TO RELATED APPLICATIONS

This U.S. National Stage Patent Application claims the benefit of PCT International Patent Application Serial No. PCT/US2020/067611, filed Dec. 31, 2020, entitled "Adjustable Balancing Block For Closed Loop Die Control" which claims the benefit of and priority to U.S. Provisional Patent Application Ser. No. 62/958,861 filed on Jan. 9, 2020, titled "Adjustable Balancing Block For Closed Loop Die Control," the entire disclosures of which are hereby incorporated by reference.

BACKGROUND OF THE INVENTION

1. Field of the Invention

The present invention generally relates to a stamp tool assembly and a method of forming a part. More particularly, the present invention relates to a stamp tool assembly with an adjustable block assembly and a method for forming a part with tailored material draw-in.

2. Related Art

This section provides background information related to the present disclosure which is not necessarily prior art.

Stamping is a popular production process wherein a metal sheet or blank is placed within a stamping apparatus between an upper die and a lower die and pressed into a useful shape. Some of the known advantages of the stamping process include quickly forming relatively sturdy and complex shapes without much material waste. Because of these known efficiencies, stamping has been widely adopted by the automobile industry, for example, forming automotive body components. However, despite these advantages, there are still persistent problems in the art, such as irregularities in parts that result from a variety of material draw-in during stamping. When a blank is pressed into a die recess the material is stretched and oftentimes exhibits inconsistent internal straining. When the material draw-in is insufficient, e.g., too little, these inconsistences can result in splits or waves in the material, which may be present throughout a production cycle with numerous blank stampings. Similarly, when there material draw-in is excessive, e.g., too much, these inconsistencies can result in slip lines and wrinkles.

Accordingly, there is a continuing desire to further develop and refine stamping processes to limit the amount of inconsistences resulting from the material draw-in of a stamped part.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, an adjustable block assembly for a stamping tool is provided. The adjustable block assembly comprises a top plate including a bottom surface defining a plurality of top plate teeth and a lower plate including a top surface defining a plurality of lower plate teeth sized to interlock with the top plate teeth. The lower plate is moveable with respect to the top plate for interlocking respective teeth between a plurality of settings. At least one of the top plate and the lower plate includes a body that is inclined.

According to another aspect of the disclosure, a stamp tool assembly is provided. The stamp tool assembly comprises forming cavity and a first draw-in surface and a second draw-in surface adjacent to the forming cavity and defining a space therebetween. The stamp tool assembly incudes at least one adjustable block assembly. The at least one adjustable block assembly comprises a top plate including a bottom surface defining a plurality of top plate teeth and a lower plate including a top surface defining a plurality of lower plate teeth sized to interlock with the top plate teeth. The lower plate is moveable with respect to the top plate for interlocking respective teeth between a plurality of settings. At least one of the top plate and the lower plate includes a body that is inclined.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 17 is another schematic top view wherein a second part is formed with the stamp tool assembly and a reading from the draw-in sensor indicates that the adjustable block assembly needs to be adjusted for reduced material draw-in;

FIG. 18 is another schematic top view wherein a third part is formed with the stamp tool assembly and the adjustable block assembly has been adjusted and the part has a reduced amount of material draw-in;

FIG. 19 is another schematic top view wherein a fourth part is formed with the stamp tool assembly and a reading from the draw-in sensor indicates that the adjustable block assembly needs to be adjusted for more material draw-in; and FIG. 20 is another schematic top view wherein a fifth part formed with the stamp tool assembly and the adjustable block assembly has been adjusted and the part has an increased amount of material draw-in.

DESCRIPTION OF THE ENABLING EMBODIMENT

Example embodiments will now be described more fully with reference to the accompanying drawings. In general, the subject embodiments are directed to a stamp tool assembly with an adjustable block assembly a method of forming a part with tailored material draw-in. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the stamp tool assembly with the adjustable block and method of same are provided for forming a part with a tailored amount of material draw-in.

Figure 1:
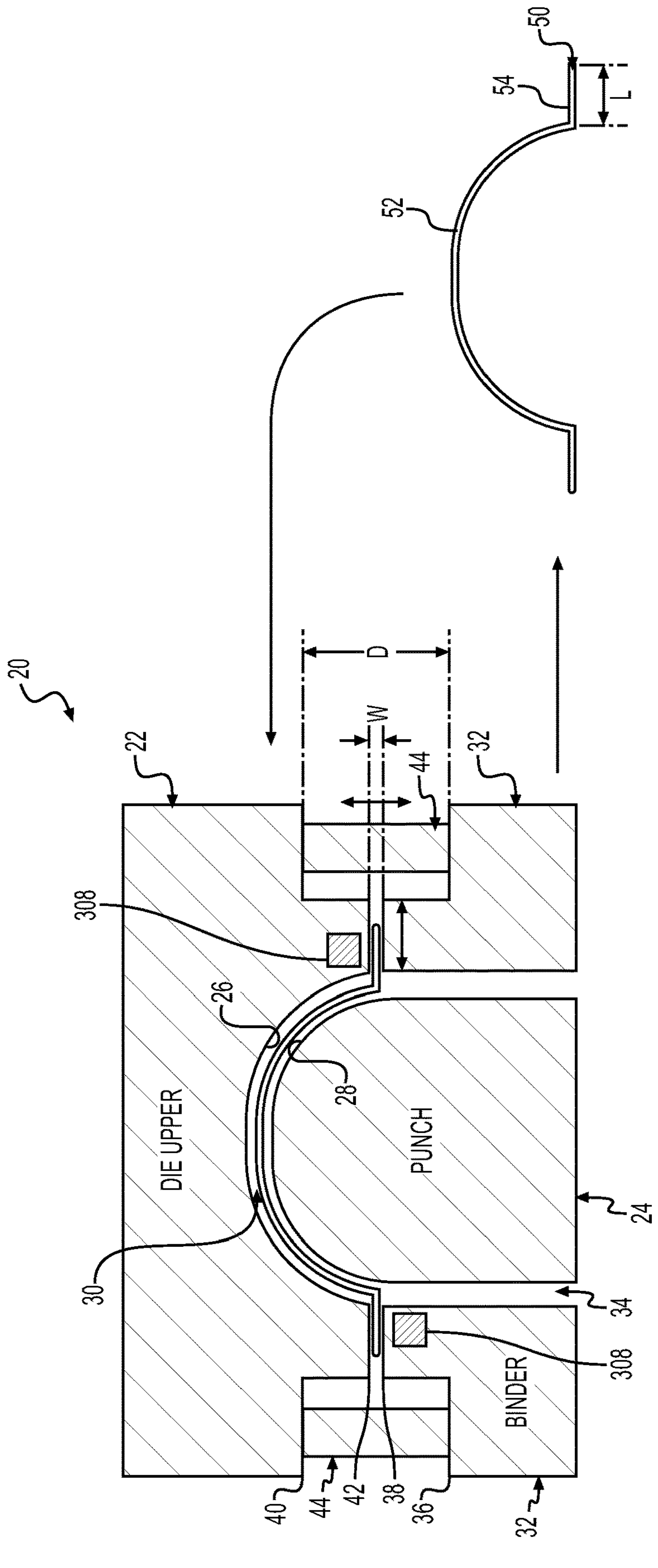
FIG. 1 is a side view of a stamp tool assembly having an adjustable block assembly and a part that has been stamped in accordance with one aspect of the disclosure.

Referring initially to FIG. 1, the stamp tool assembly 20 is generally shown. The stamp tool assembly 20 includes an upper die 22 and a lower punch 24. A the upper die 22 includes an upper die surface 26 and the lower punch 24 includes a lower punch surface 28. A forming cavity 30 is formed between the upper die surface 26 and the lower punch surface 28. A binder die 32 surrounds the punch 24 and includes an opening 34 that allows the punch 24 to move there along. The binder die 32 includes a lower adjustable block surface 36 and a lower draw-in surface 38 surrounding the opening 34. The upper die 22 likewise includes an upper adjustable block surface 40 surrounding the upper die surface 26 and an upper draw-in surface 42 located between the upper die surface 26 and the upper adjustable block surfaces 40. At least one adjustable block assembly 44 (i.e., adjustable block assemblies 144 and 244) is located between the lower adjustable block surface 36 and the upper adjustable block surface 40. The at least one adjustable block assembly 44, may include a plurality of adjustable block assemblies 44. Each adjustable block assembly 44 may be attached to either the upper die 22, the binder die 32, combinations thereof, or completely separate. A draw-in sensor 308 is located in, on, or near the lower and upper draw-in surfaces 38, 42 and may also be equal in number and located adjacent to each adjustable block assembly 44. The draw-in sensors 308 can use optical and inductive measurement techniques. It should be appreciated that the terms "upper" and "lower" are not to be construed as limiting, but are merely used for the purpose of illustrating the stamp tool assembly 20 in accordance with one aspect of the disclosure.

In operation, the upper die 22 moves relative to the lower punch 24 and the binder die 32 to open the forming cavity 30 enough to place a blank, i.e., a part 50 to be stamped. The part 50 is then placed within the forming cavity 30 with at least a portion of the part 50 overlapping the lower draw-in surface 38 and the upper draw-in surface 42. The upper die surface 26 and the lower punch surface 28 are moved towards one another, wherein the punch 24 moves within the opening 34. The vertical extension D of the adjustable block assemblies 44 are set to adjust the spacing W between the lower and upper draw-in surfaces 38, 42. The adjustments of the spacing W between the lower and upper draw-in surfaces 38, 42 changes the amount of material in the part 50 that is drawn into the forming cavity 30. This relationship between the spacing W and the amount of the material draw-in of the part 50 is formulaic and thus can be specifically adjusted. In accordance with one aspect, the relationship between the spacing W and the draw-in material can be determined and fine-tuned to limit the variation of material draw-in that is common in the art. For example, once the part 50 is stamped, it includes a shaped portion 52 and a flange portion 54 that has a length L. The length L of the flange portion 54 can be measured by the draw-in sensor 308, wherein if there is too much draw-in or in-flow (which may be associated with a small length L), the adjustable block assembly 44 can be vertically reduced for an reduction in material draw-in and an increased length L. Similarly, if there is too little draw-in or in-flow (which may be associated with a large length L), the adjustable block assembly 44 can be vertically expanded for an increased material draw-in and decreased length L. As such, for each subsequent part or blank that is stamped, the adjustable block assembly 44 can be adjusted or tuned until the resulting part 50 meets specific standards of draw-in and quality. As explained previously, there may be a plurality of adjustable block assemblies 44 and corresponding draw-in sensors 308 surrounding the forming cavity 30.

Figure 2:
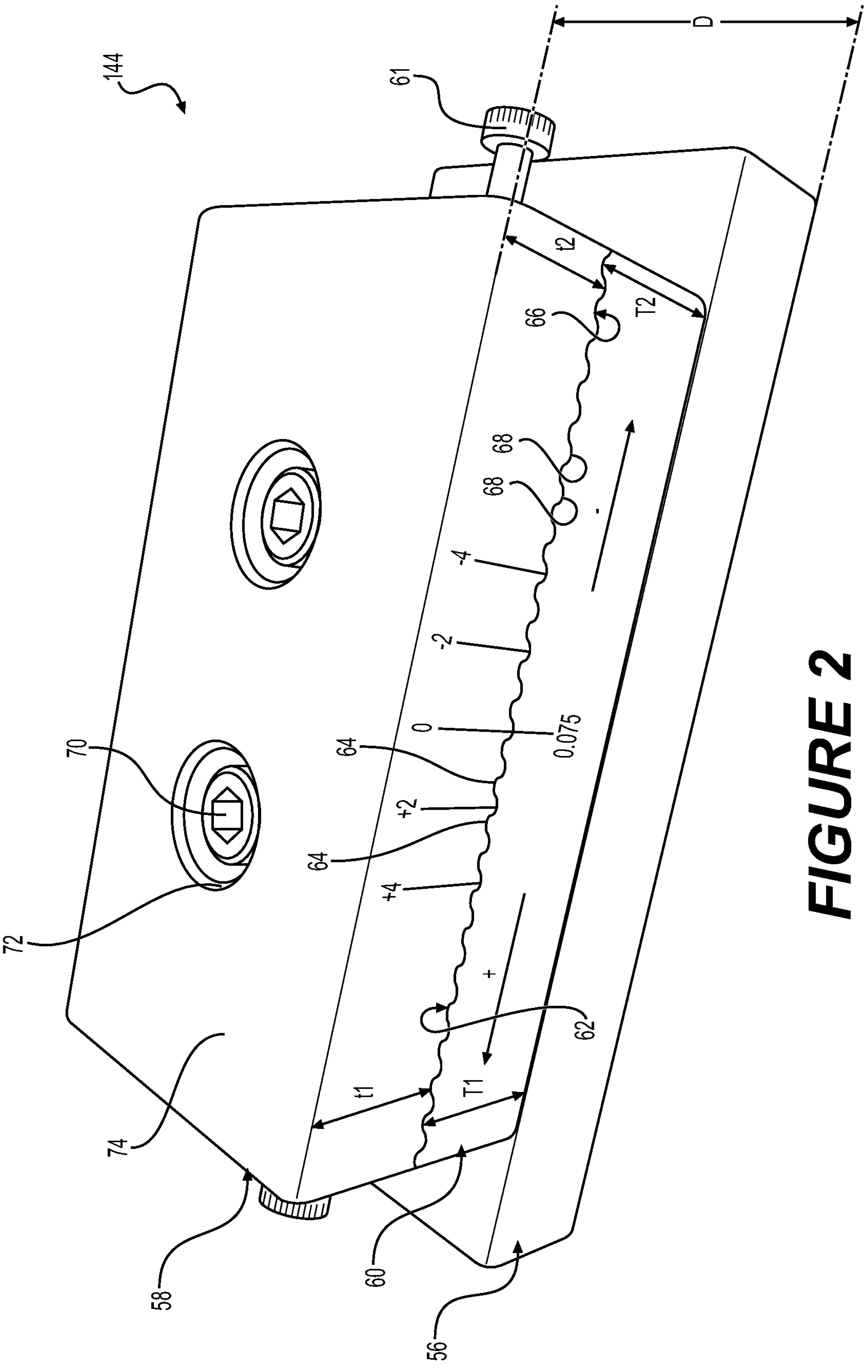
FIG. 2 is perspective view of the adjustable block in accordance a first embodiment of the disclosure.

A perspective view of a first embodiment of the adjustable block assembly 144 is shown in FIG. 2. The adjustable block assembly 144 may be integral with, permanently connected to, releasably connected to, or not connected the upper die 22. the binder die 32, or a combination thereof. The adjustable block assembly 144 includes a base plate 56, a top plate 58, and a lower plate 60 that is sandwiched between and moveable relative to the base plate 56 and the top plate 58. Movement of the lower plate 60 relative to the base plate 56 and the top plate 58 changes the vertical extension D of the adjustable block assembly 44. More particularly, the lower plate 60 includes an upper surface 62 with a series of teeth 64 and the top plate 56 includes a bottom surface 66 with a series of corresponding teeth 68. At least one of the base plate 56, the top plate 58, and the lower plate 60 are inclined. In some embodiments, the lower plate 60 is inclined such that it gets thicker from left T1 to right T2 and the top plate 58 is inclined such that it gets thicker from right t2 to left t1 at a similar or identical but opposite incline. In some embodiments, the incline between plates 58, 60 may be on the same direction or at different inclines. In some embodiments, the corresponding sets of teeth 64, 68 vary in size, wherein the teeth 64, 68 get sequentially larger from left to right. Accordingly, as the lower plate 60 moves with respect to the top plate 58, larger teeth 64 interact with smaller teeth 68 and the vertical extension D is expanded at a greater rate because the teeth 64, 68 to not completely interlock. In some embodiments, the teeth 64, 68 may be equal in size for interlocking. At least one fastener 70 is used to clamp and hold the base plate 56, top plate 58, and lower plate 60 in place. The top plate 54 includes a counterbore 72 for each fastener 70 so that the fastener is flush or below a top surface 74 of the top plate 54. When in use, the top surface 74 of the top plate 54 is parallel and in contact with one of the lower and upper draw-in surfaces 38, 42 and the base plate 56 is parallel and in contact with the other of the lower and upper draw-in surfaces 38, 42. The base plate 56 may include a bottom surface 57 that is parallel to the top surface 74 of the top plate 54. A driving member 61 may extend through and be operatively connected to the lower plate 60. The driving member 61 may include a treaded screw that, when rotated, moves the lower plate 60 with respect to the top plate 58.

Figure 3:
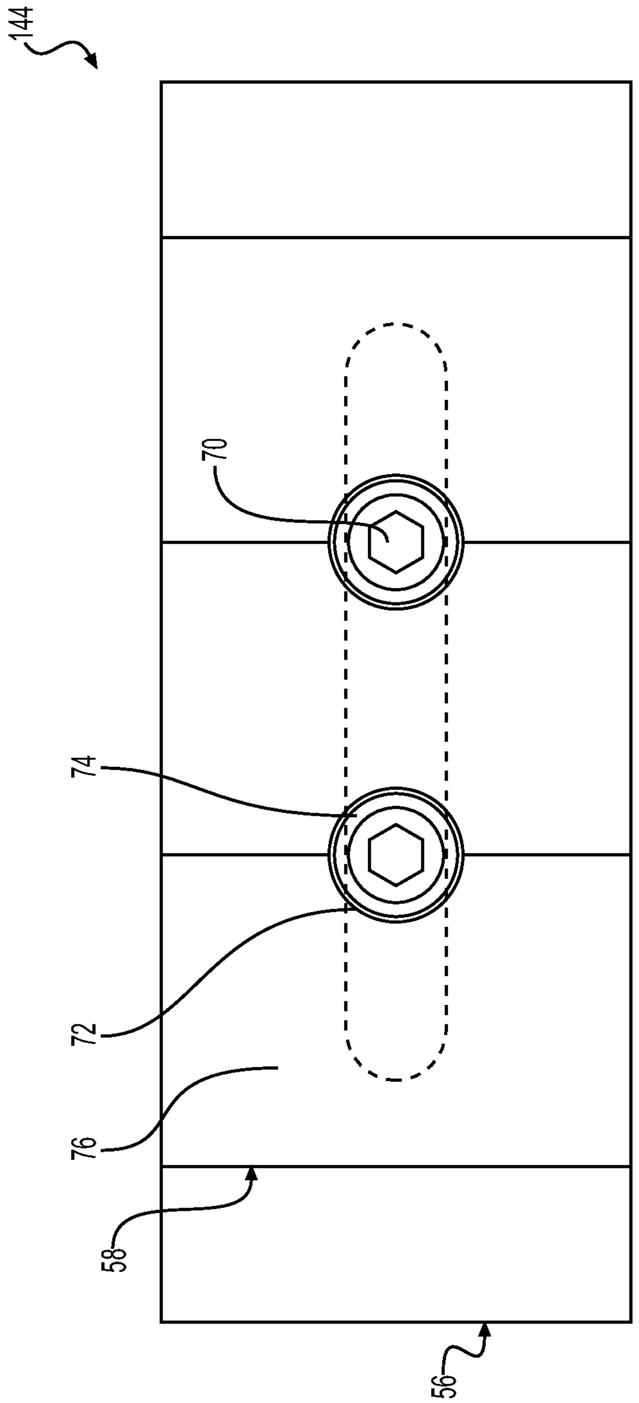
FIG. 3 a top view of the adjustable block assembly with holding fasteners for securing the adjustable block assembly in a number of adjustable settings.
Figure 4:
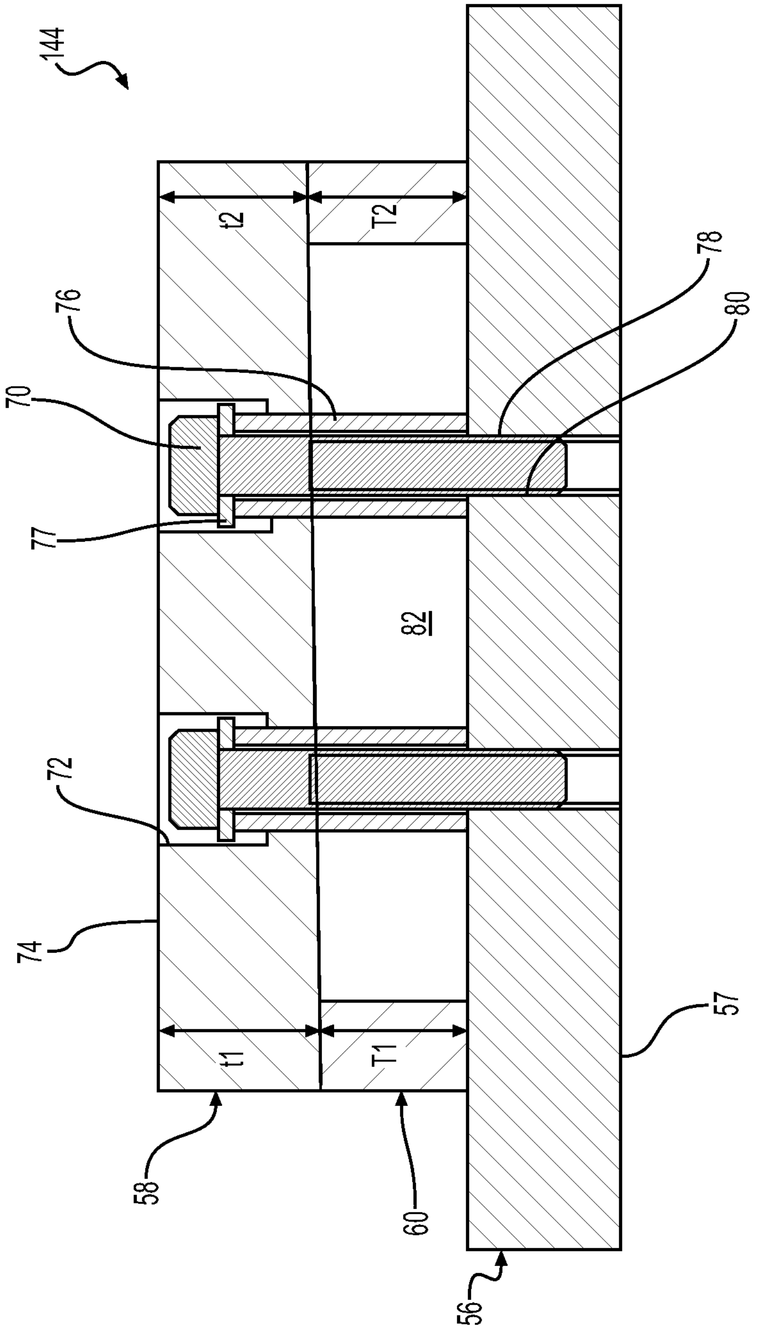
FIG. 4 a sectional side view of the adjustable block assembly illustrating internal components thereof in accordance with yet another aspect of the disclosure.

FIG. 3 is a top view of the adjustable block assembly 144 and FIG. 4 is a sectional side view of the adjustable block illustrating internal components. As best illustrated in FIG. 4, each fastener 70 extends from the top plate 58, through the lower plate 60, and into the base plate 56. A sleeve 76 surrounds a portion of each fastener 70 and extends from the top plate 58, through the lower plate 60, and terminates at the base plate 56. The fastener 70 may include a threaded body 78 and the base plate 56 may also include corresponding threads 80. The lower plate 60 includes a central elongated cavity 82 that is large enough to allow the fastener 70 and the sleeve 76 to move therein between the numerous adjustment settings. A washer 77 may be located between a fastener head on the fastener 70 and the sleeve 76.

Figure 5:
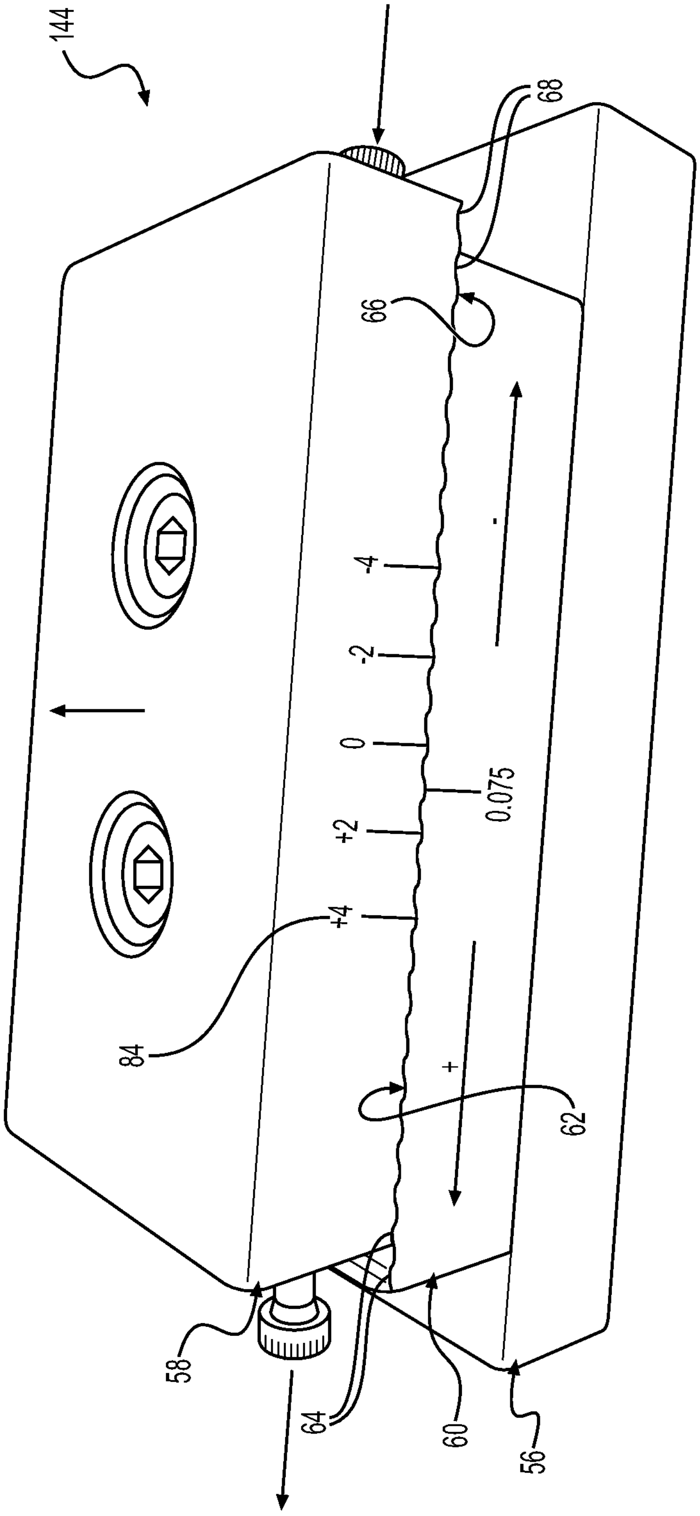
FIG. 5 is a perspective view of the adjustable block assembly adjusted to provide a part with more inflow and increased material draw-in than the setting presented in FIG. 2.

FIG. 5 illustrates the adjustable block assembly 44, wherein the lower plate 60 has been moved relative to the base plate 56 and the top plate 58 by one tooth 64, 68. Each tooth 64, 68 represents one adjustment setting. Each adjustment setting may change the vertical extension D of the adjustable block assembly 44 by, for example, a millimeter or less, a tenth of a millimeter or less, a hundredth of a millimeter or less, or a thousandth of a millimeter or less. In the illustrated arrangement, each adjustment setting (interlocking of a next adjacent tooth) changes the vertical extension D of the adjustable block assembly 44 by 0.075 mm. The small changes in settings allow for a finely tuned draw-in. Indicia 84 may be present on a side of the adjustable block assembly 44 for illustrating the selected settings.

Figure 6:
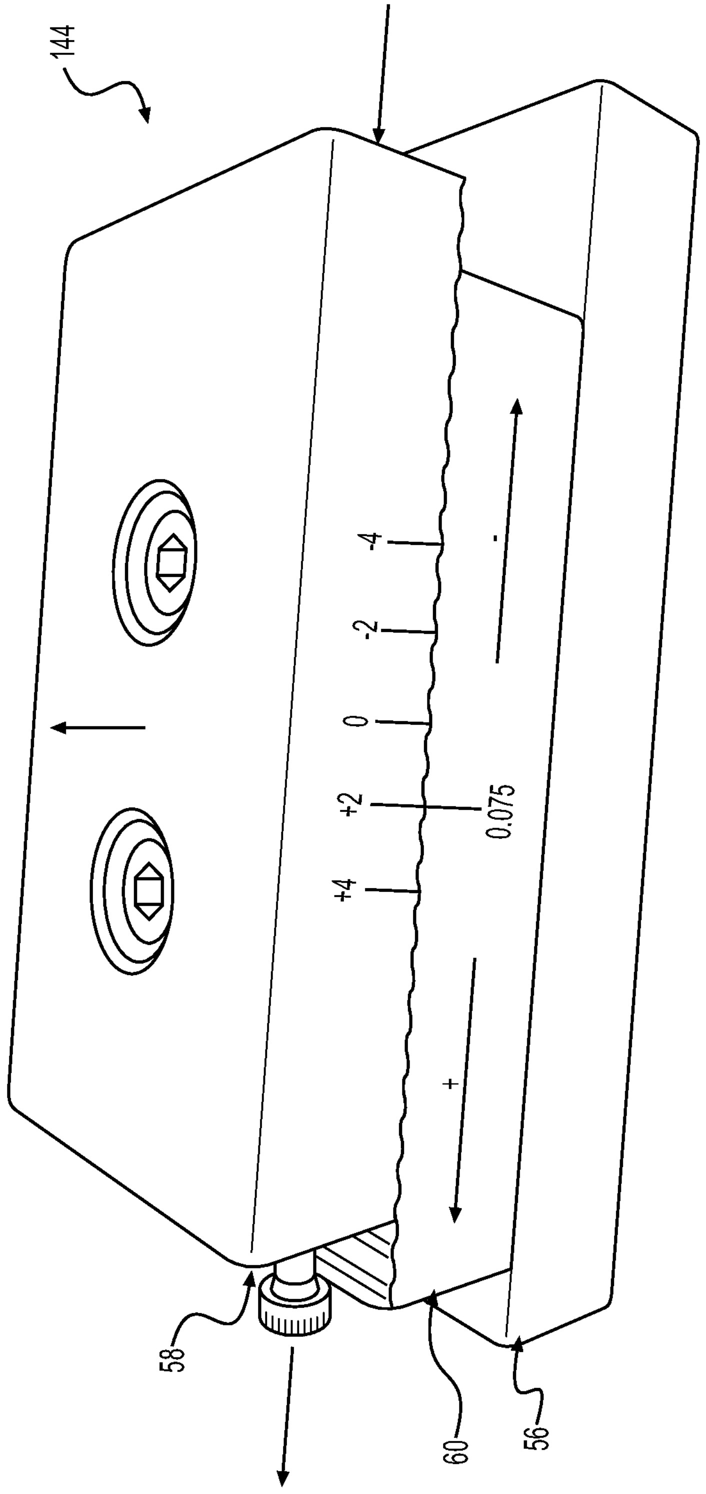
FIG. 6 is a perspective view of the adjustable block assembly adjusted to provide a part with even more inflow and more material draw-in than the setting presented in FIG. 5.
Figure 7:
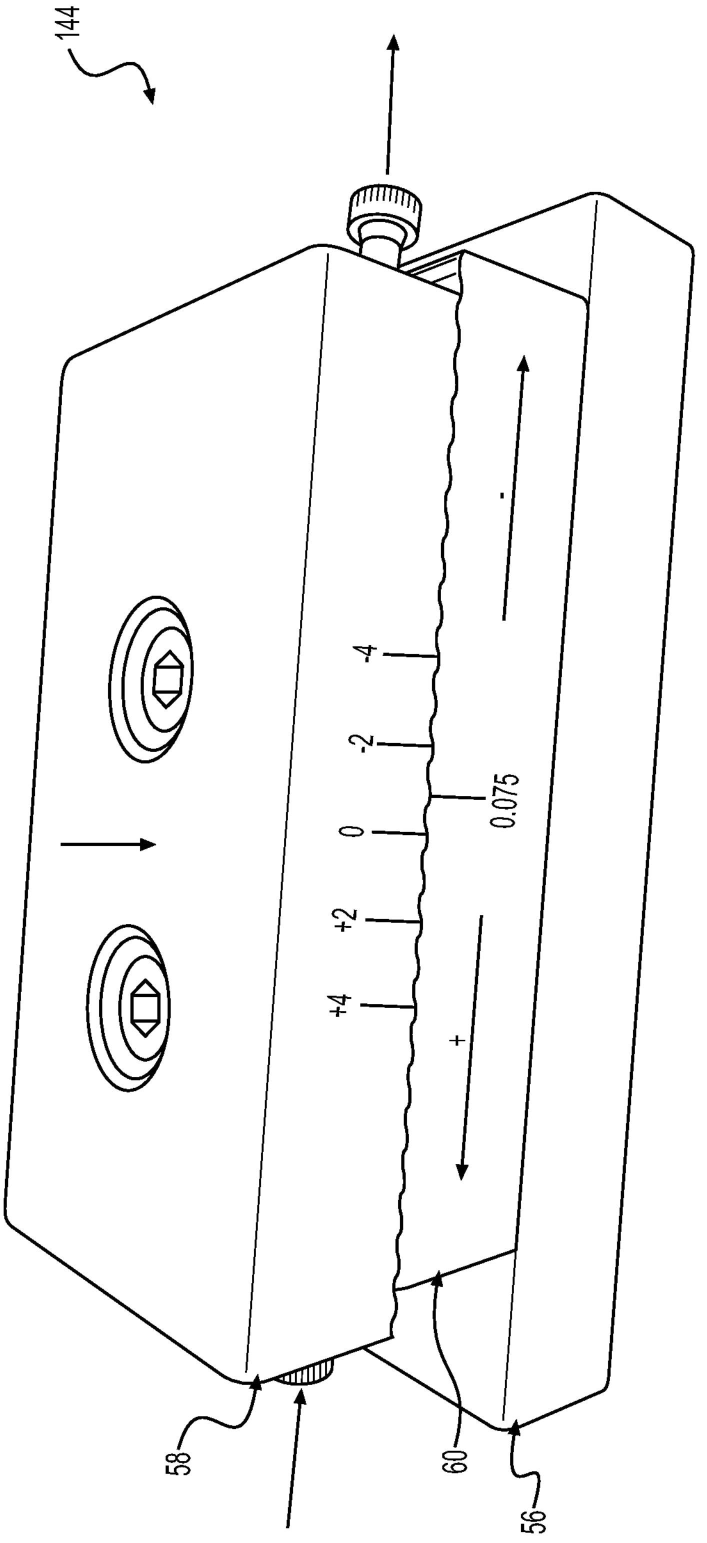
FIG. 7 is a perspective view of the adjustable block assembly adjusted to provide a part with less inflow and less material draw-in than the setting presented in FIG. 2.
Figure 8:
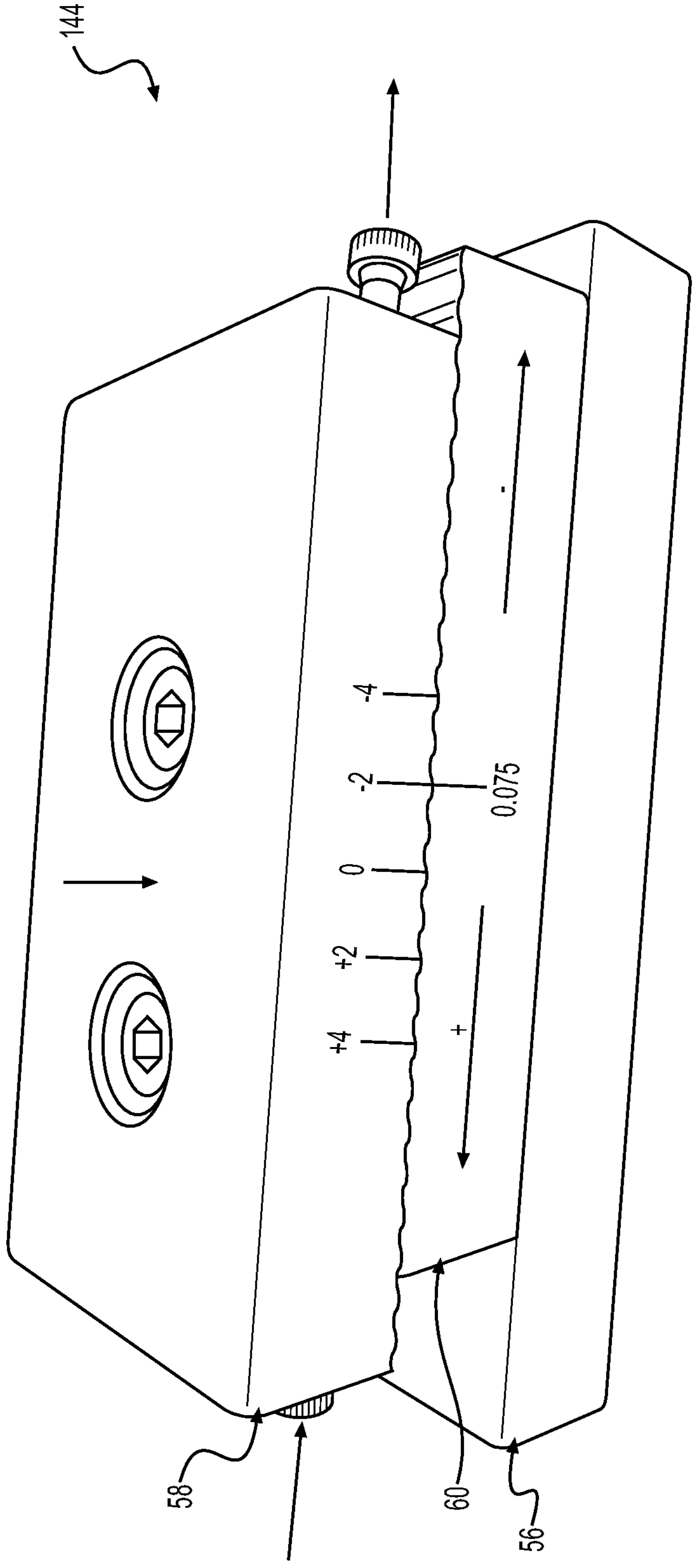
FIG. 8 is a perspective view of the adjustable block assembly adjusted to provide a part with even less inflow and less material draw-in than the setting presented in FIG. 7.

In FIG. 6, the lower plate 60 has been moved relative to the base plate 56 and the top plate 58 by two teeth 64, 68. As such, the vertical extension D of the adjustable block assembly 44 has increased by 0.150 mm. In FIG. 7, the lower plate 60 has been moved relative to the base plate 56 and the top plate 58 in the opposite direction from FIGS. 5 and 6 by one tooth 64, 68. As such, the vertical extension D of the adjustable block assembly 44 has decreased by 0.075 mm. In FIG. 8, the lower plate 60 has been moved relative to the base plate 56 and the top plate 58 in the same direction as FIG. 7 by another tooth 64, 68 or two teeth total from center. As such, the vertical extension D of the adjustable block assembly 44 has decreased by 0.150 mm. There may be any number of teeth 64, 68 and corresponding settings. For example, there may be at least thirty settings, at least twenty settings, at least ten settings, or at least five settings.

Figure 9:
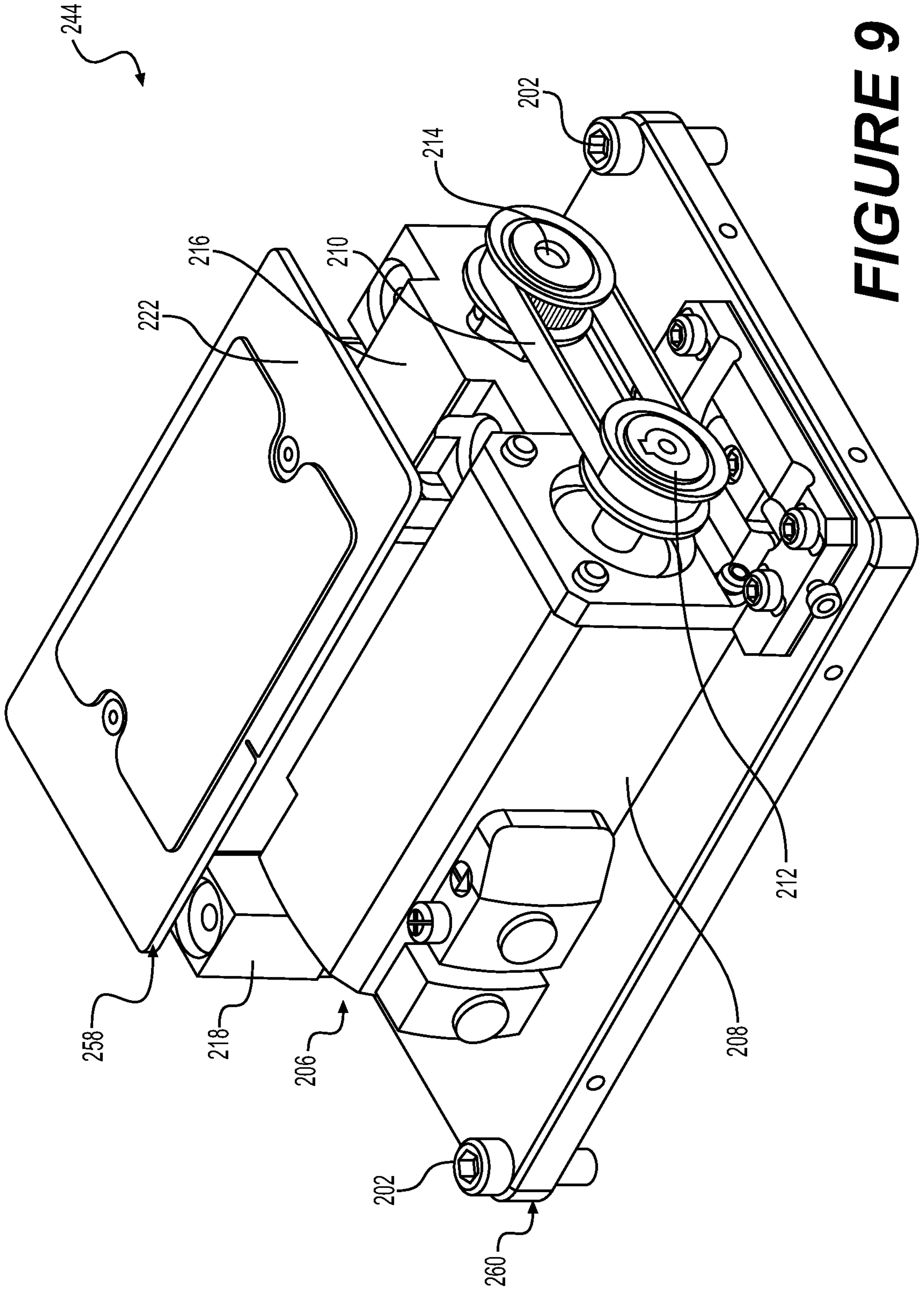
FIG. 9 is a perspective view of an adjustable block assembly in accordance with a second embodiment of the disclosure.
Figure 10:
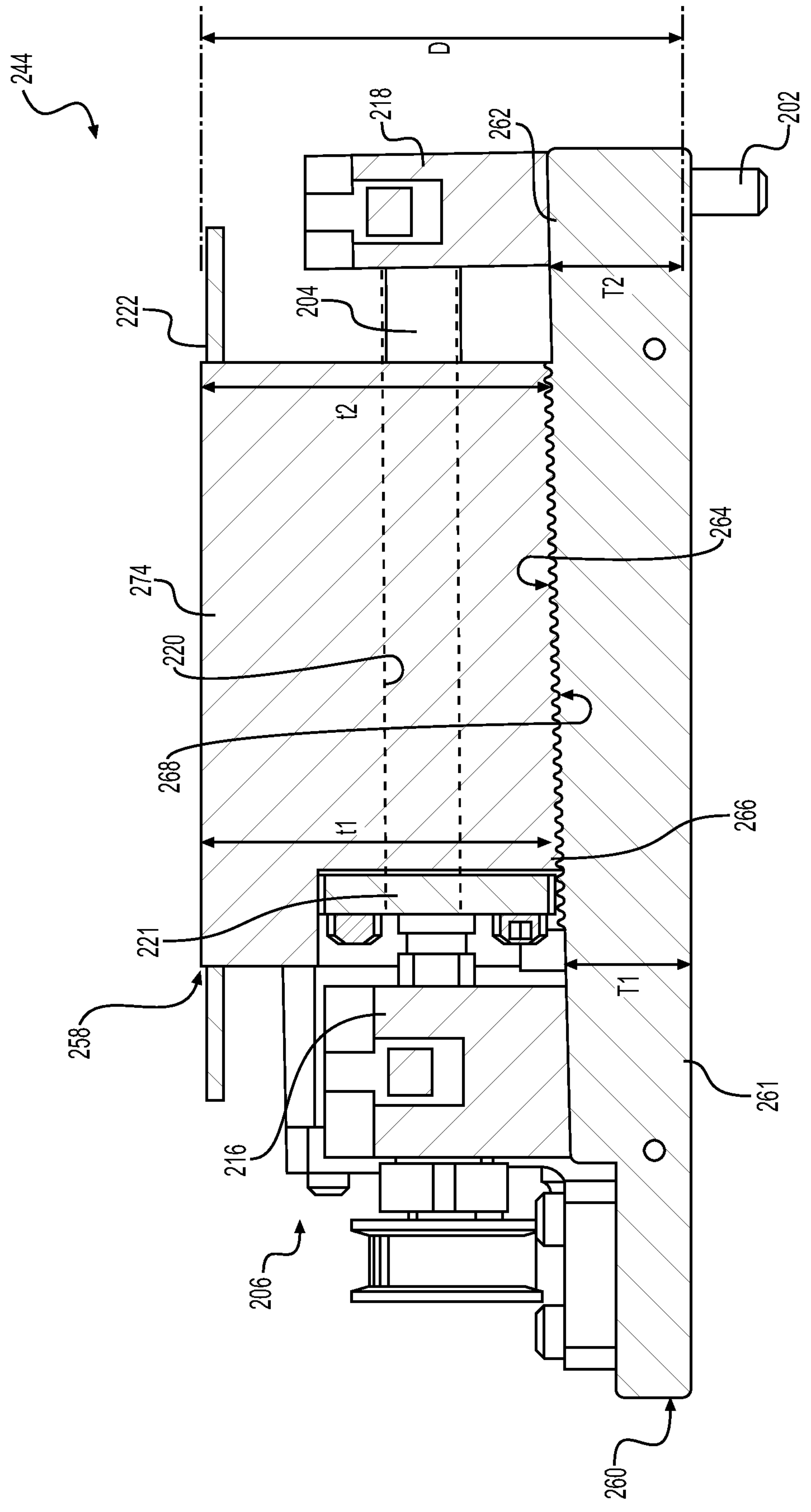
FIG. 10 is a cross-sectional view of the adjustable block assembly in accordance with the second embodiment.

FIG. 9 illustrates a perspective view of an adjustable block assembly 244 in accordance with a second embodiment of the disclosure. Unless otherwise indicated, the adjustable block assembly 244 may include all the features of the adjustable block assembly 144 present in FIGS. 2 through 8, including the disclosed teeth arrangements and inclines. However, the adjustable block assembly 244 includes additional systems and features that control operation of the adjustable block assembly 244. The adjustable block assembly 244 includes a top plate 258, and a lower plate 260. Movement of the lower plate 260 relative to the top plate 258 changes the vertical extension D of the adjustable block assembly 244. More particularly, the lower plate 260 includes an upper surface 262 with a series of teeth 264 and the top plate 256 includes a bottom surface 266 with a series of corresponding teeth 268 (FIG. 10). At least one of the top plate 258, and the lower plate 260 are inclined. In some embodiments, the lower plate 260 is inclined such that it gets thicker from left T1 to right T2 and the top plate 258 is inclined such that it gets thicker from right t2 to left t1 at a similar or identical but opposite incline. In some embodiments, the incline between plates 258, 260 may be in an in the same direction or at different inclines. In some embodiments, the corresponding sets of teeth 264, 268 vary in size, wherein the teeth 264, 268 get sequentially larger from left to right. In some embodiments, the teeth 264, 268 may be equal in size for interlocking. In some embodiments, the top plate 254 includes a top surface 274 and the lower plate 260 includes a bottom surface 261, wherein the top surface 274 and the bottom surface 261 are substantially parallel between each of the adjustment settings.

With continued reference to FIG. 9, the lower plate 260 includes a series of interlocking members 202, such as pins or threaded fasteners located in opposite edges of the lower plate 260, that interlocks with at least one of the upper die 22 and the binder die 32. In some embodiments, at least one of the upper die 22 and the binder die 32 may include corresponding apertures (not shown) sized for inserting the interlocking members 202.

Figure 11:
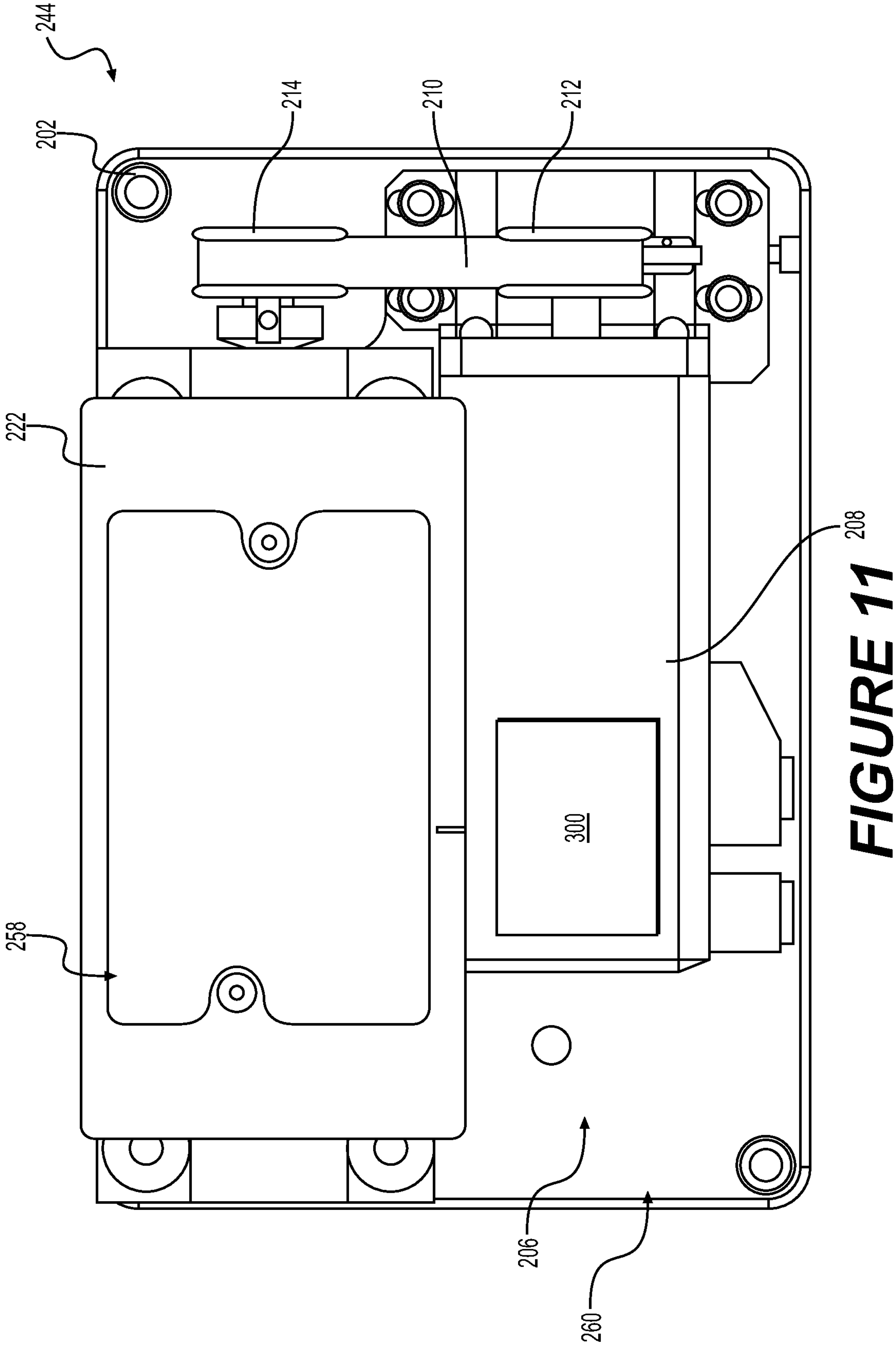
FIG. 11 is a top view of the adjustable block assembly in accordance with the second embodiment.

As best illustrated in FIG. 9 through FIG. 11, the adjustable block assembly 240 further includes a driven member 204 (e.g., a lead screw, rack and pinion, other gear arrangements, hydraulics, or combinations thereof) operably connected to the top plate 258. In operation, actuation of the driven member 204 causes movement of the top plate 258 in the left or right direction thus adjusting the vertical extension D of the adjustable block assembly 240. In some embodiments, the driven member 204 is operably connected to an actuator 206 that causes movement of the driven member 204 to adjust the vertical extension. In some embodiments, the actuator 206 includes a motor 208 and a driving belt 210 connected between the motor 208 and the driven member 204. However, it should be appreciated that in other arrangements, the motor 208 may be directly connected to the driven member 204 or otherwise intermeshed with gear teeth.

Figure 12:
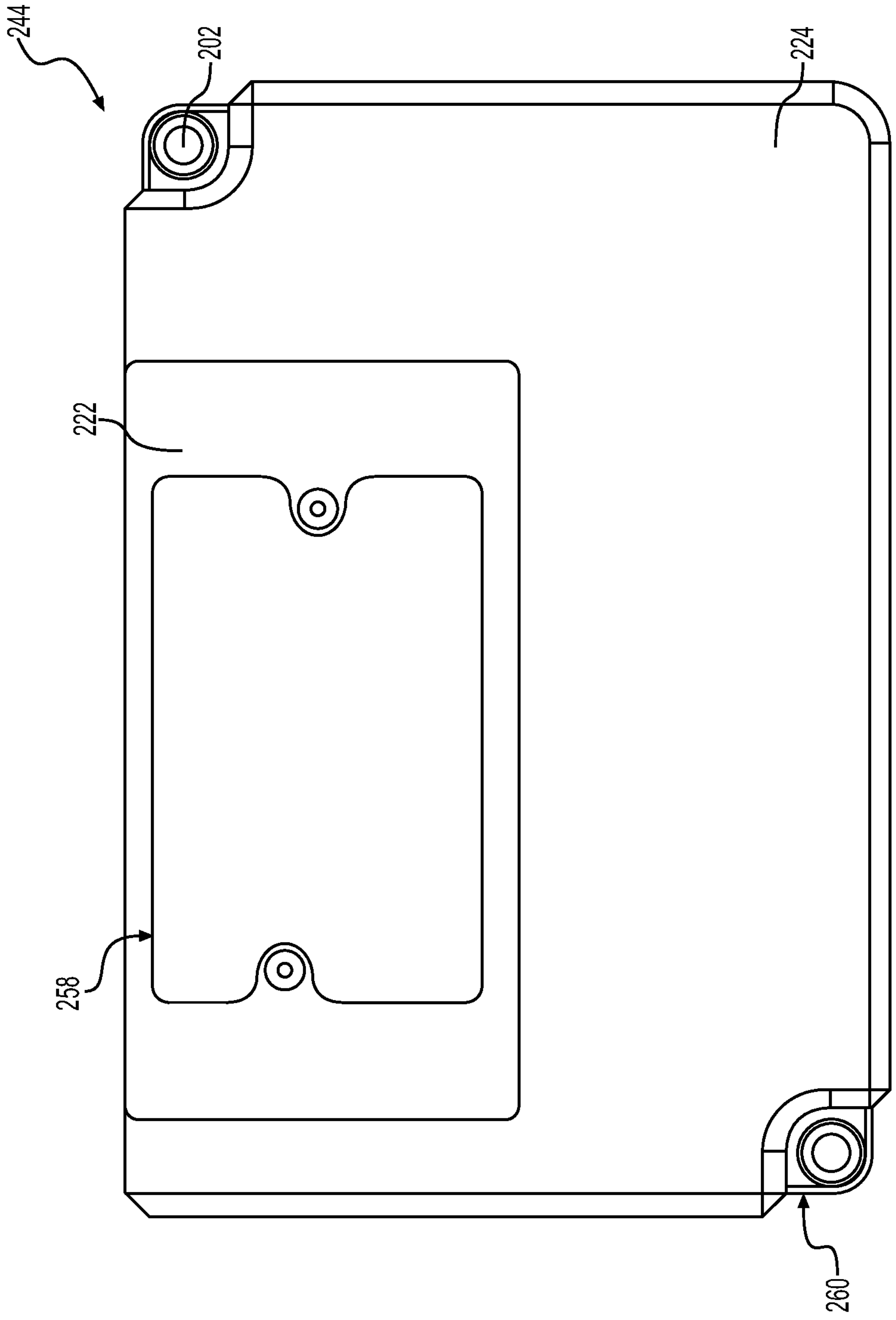
FIG. 12 is a top view of the adjustable block assembly primarily located within a housing in accordance with the second embodiment.

In some embodiments, the driving belt 210 may connect to a motor roller 212 of the motor 208 and a driven roller 214 of the driven member 204. In some embodiments, the rollers 212, 214 and the driving belt 210 may include intermeshed teeth. A first holding bracket 216 may be connected to the lower plate 260 on one side the of top plate 258 and a second holding bracket 218 may be connected to the lower plate 260 on an opposite side of the top plate 258 for axially and radially retaining the driven member 204 while allowing the driven member 204 to rotate and providing adjustment setting limits. A portion of the top plate 258 between the brackets 216, 218 may define an opening 220 (FIG. 10) for receiving the driven member 204. The opening 220 may be defined by an inner toothed surface intermeshed with the driven member 204. In some embodiments, a driving plate 221 is located on at least one end of the opening 220 and includes an toothed opening intermeshed with the driving member 204. In some embodiments, the top plate 254 may further include a cover 222 surrounding the top surface 274 for providing additional contract to the stamp tool assembly during operation. With reference now to FIG. 12, the adjustable block assembly 244 may including a housing 224 for covering primarily all the components other than at least a portion of the top plate 254, such that it can be vertically adjusted and extend out of the housing 224. In some embodiments, the housing 224 further includes recesses exposing interlocking members 202 to facilitate access thereto.

Figure 13:
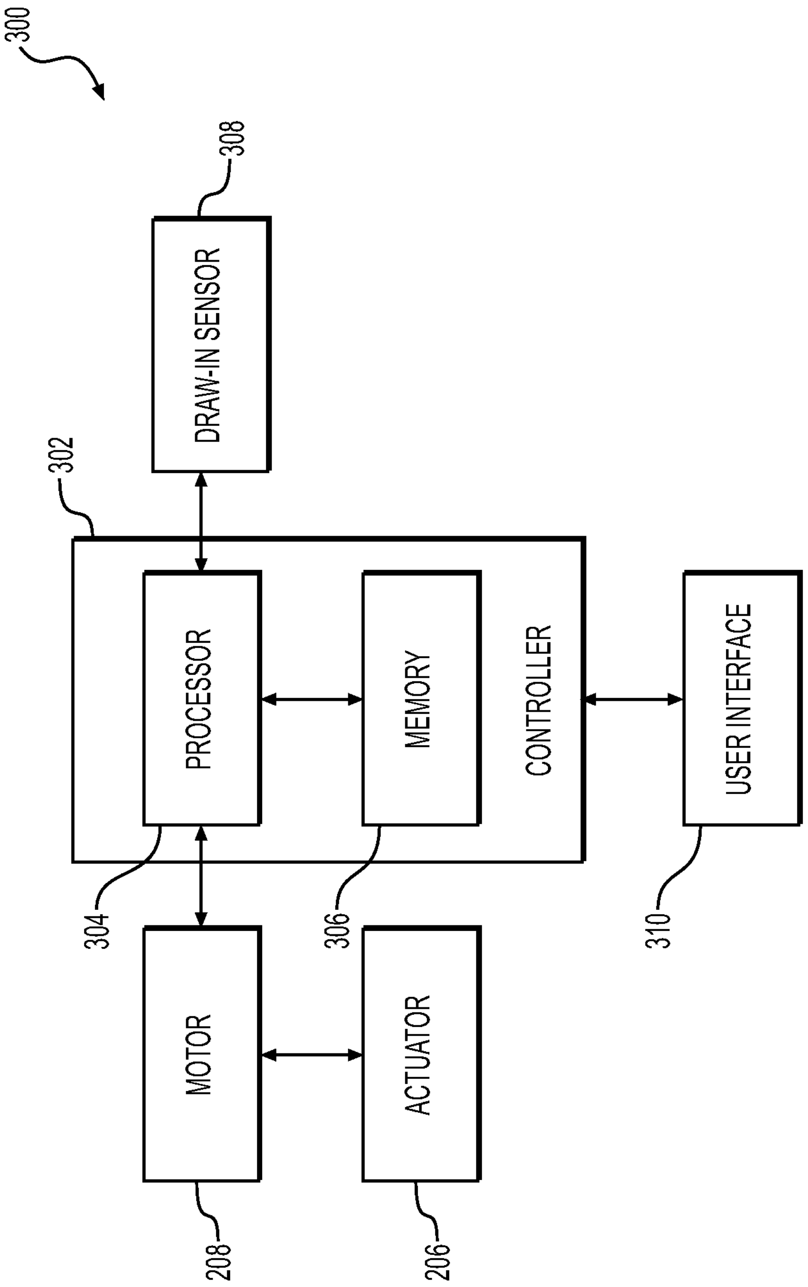
FIG. 13 generally illustrates a block diagram of a controlling system of the stamp tool assembly.

With reference now to FIG. 13, operation of the actuator 206 is facilitated by a controller system 300. The controller system 300 may include a controller 302 and the controller 302 may include a processor 304 and a memory 306. The controller 302 may be located in the lower plate 260, the housing 224, or outside of the adjustable block assembly 244. The processor 304 may include any suitable processor, such as those described herein. Additionally, or alternatively, the controller 302 may include any suitable number of processors, in addition to or other than the processor 304. The memory 306 may comprise a single disk or a plurality of disks (e.g., hard drives), and includes a storage management module that manages one or more partitions within the memory 306. In some embodiments, memory 306 may include flash memory, semiconductor (solid state) memory or the like. The memory 306 may include Random Access Memory (RAM), a Read-Only Memory (ROM), or a combination thereof. The memory 306 may include instructions that, when executed by the processor 304, cause the processor 304 to, at least, perform the systems and methods described herein. The control system 300 may include or be in communication with at least one draw-in sensor 308, the motor 208, and the actuator 206. As such, an amount of material draw-in may be measured by the draw-in sensor 308 and relayed to the processor 302 and cause the processor 302 to instruct a certain output by the motor 208, the actuator 206, or a combination thereof. The controller system 300 may include least one user interface 310, and the processor 304 may generate a signal that indicates on the user interface 310 an amount of material draw-in and whether the amount of material draw-in is within a predefined threshold. The draw-in sensor 308 may include discrete limit sensors, analog linear transducers, machine vision, or combination thereof. Output sensors may further be present to measure movement of the motor 308 or actuator 206.

Figure 14:
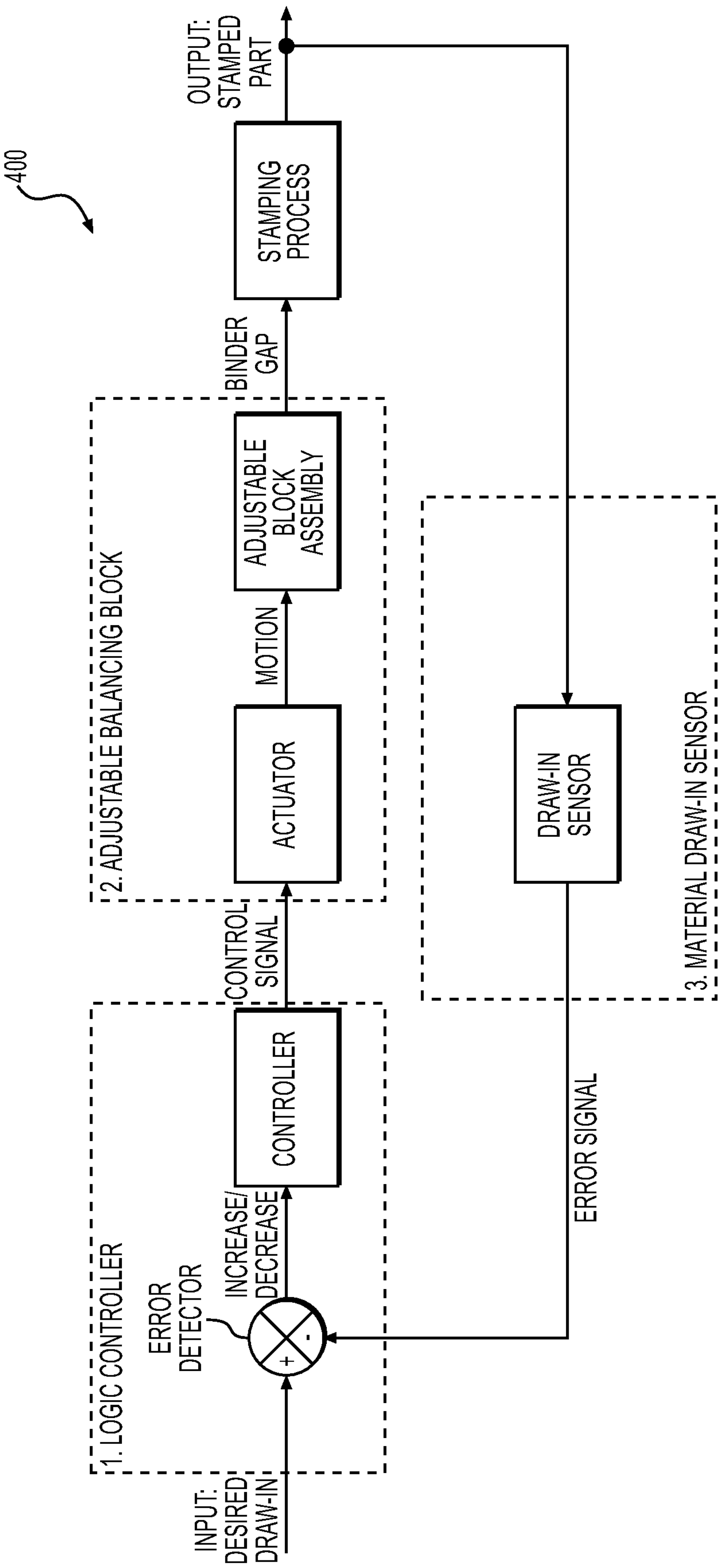
FIG. 14 is a method flow chart illustrating a method in accordance with one aspect of the disclosure.

FIG. 14 illustrates a flowchart of a method 400 of forming a part with tailored draw-in amounts. A desired draw-in amount may be input into the control system 300, for example, via the user interface 310. The desired draw-in amount may be determined between an upper control limit corresponding to a threshold over draw-in amount wherein the integrity of the part 50 is negatively impacted and a lower control limit corresponding to a threshold under draw-in amount wherein the integrity of the part 50 is negatively impacted. The upper control limit and the lower control limit may be determined through physical or virtual testing of the part 50 and saved in memory 306. The at least one draw-in sensor 308 relays the draw-in at least one discrete location to the processor 304, for example, via a measurement of the flange portion 25. When a draw-in sensor measurement is outside of threshold, e.g., over the upper control limit or under the lower control limit, the systems and methods as described herein may generate a signal to adjust at least one adjustable block assembly 44 (i.e., 144 and 244) as a result of an error detection.

In some embodiments, as a result of an error detection, the controller may configured to automatically adjust the at least one adjustable block assembly 44 associated with the draw-in sensor 308. For example, the processor may be configured to instruct the actuator 206 to move the top plate (58, 258) relative to the lower plate (60, 260). A correlation between a change in the vertical extension D of the adjustable block assembly 44 and/or a binder gap and a resulting change of the amount of draw-in may be saved in memory 306. The correlation may be determined through physical or virtual testing. After adjustment, the method 400 may continue by placing an additional part 50 in the stamp tool assembly 20 and re-measuring the amount of draw-in with the at least one draw-in sensor 308. The method 400 may then be continually repeated wherein if a variance of draw-in outside of the threshold upper control limit and the lower control limit is sensed, the method 400 repeats the error detection and adjustment protocol.

Figure 15:
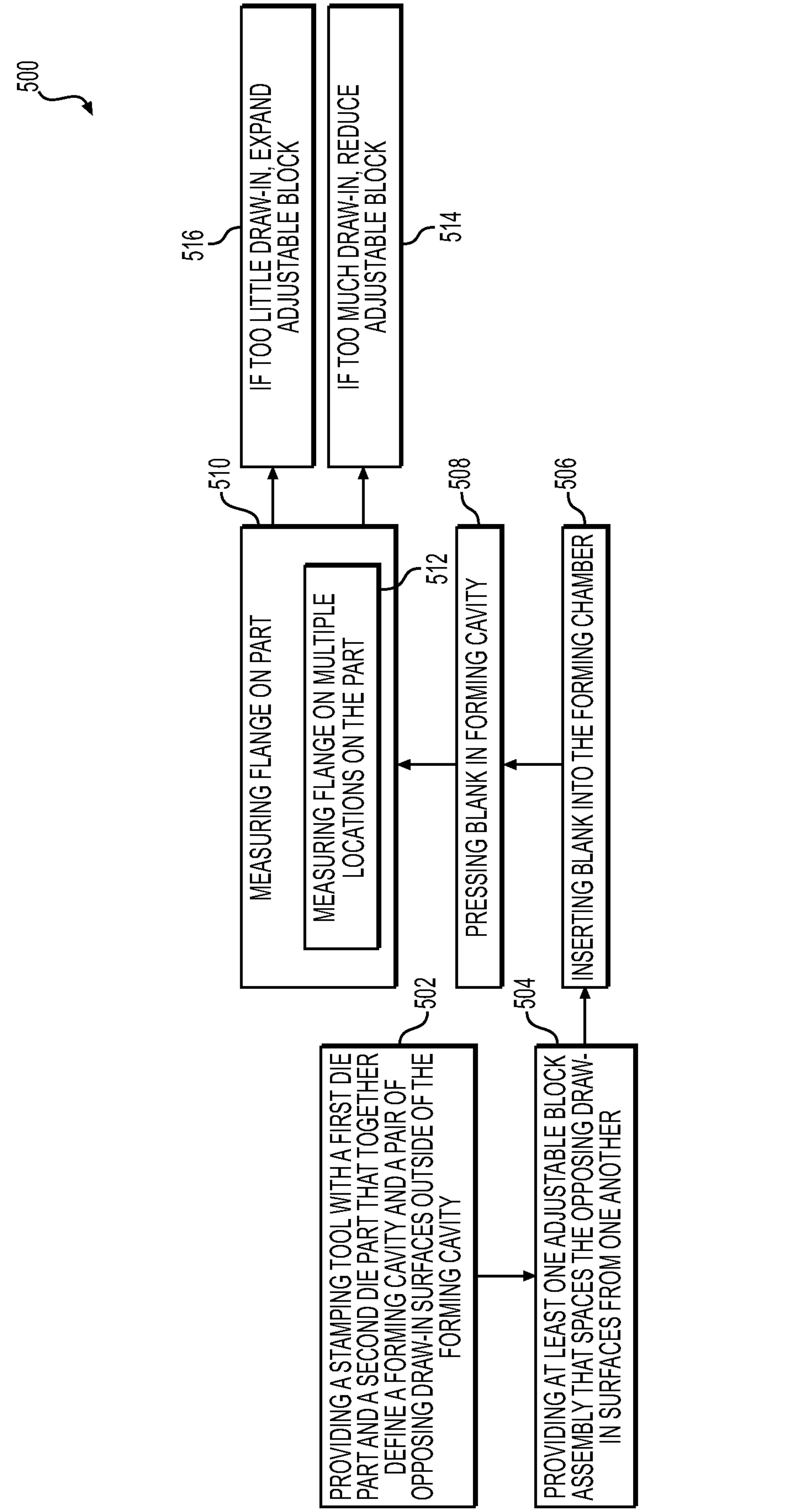
FIG. 15 is a method flow chart illustrating a method in accordance with another aspect of the disclosure.

FIG. 15 is a flowchart of a method 500 of forming a part with tailored draw-in amounts. At 502, the method 500 includes providing a stamping tool assembly with a first die part and a second die part that together define a forming cavity therebetween and a pair of opposing draw-in surfaces outside of the forming cavity. At 504, the method includes providing at least one adjustable block assembly that spaces the opposing draw-in surfaces (e.g., forming the binder gap) from one another. At 506, the method 500 includes inserting a part or blank into the forming cavity such that it at least partially overlaps with the pair of opposing draw-in surfaces. At 508, the method 500 includes pressing the blank into the cavity until it is a formed part. At 510, the method 500 includes sensing a draw-in amount of the part, for example, a flange via a draw-in sensor. Step 210 may include measuring 212 the flange at multiple discrete locations around the forming cavity with the at least one draw-in sensor. At 516, if a measurement indicates too much draw-in (e.g., a measurement above the upper control limit), the adjustable block assembly is reduced in vertical extension so that the opposing draw-in surfaces are closer to each other during a stroke. At 518, if a measurement indicates too little draw-in (e.g., a measurement below the lower control limit), the adjustable block assembly is expanded in vertical extension so that the opposing draw-in surfaces are further from one another during a stroke. The method 500 may be carried out by the computing system 300.

FIG. 16 through FIG. 20 are a series of schematic top views illustrating changing the settings on the adjustable block assembly 44 (i.e., 144 and 244) to form various parts 50A, 50B, 50C, 50D, 50E with different draw-in amounts. The draw-in sensors 308 and the adjustable block assembly 44 may be located anywhere around the forming cavity 30 to provide tailoring to the draw-in amounts at several locations. For example, they may be located a location A, a location B, a location C, a location D, a location E, a location F, a location G, a location H, or any combinations thereof. Each location (A through H) is preferably located between the binder die 32 and the upper die 22. The flange length L is measured via the draw-in sensors 308 and relayed to a user interface 310, that indicates length L for recommended adjustments. There may be a user interface 310 for each draw-in sensor 308 or for multiple draw-in sensors 308. The user interface 310 may include a monitor and input keys for manually changing settings. The user interface 310 may include a mobile device, such as a tablet, phone, or the like.

Figure 16:
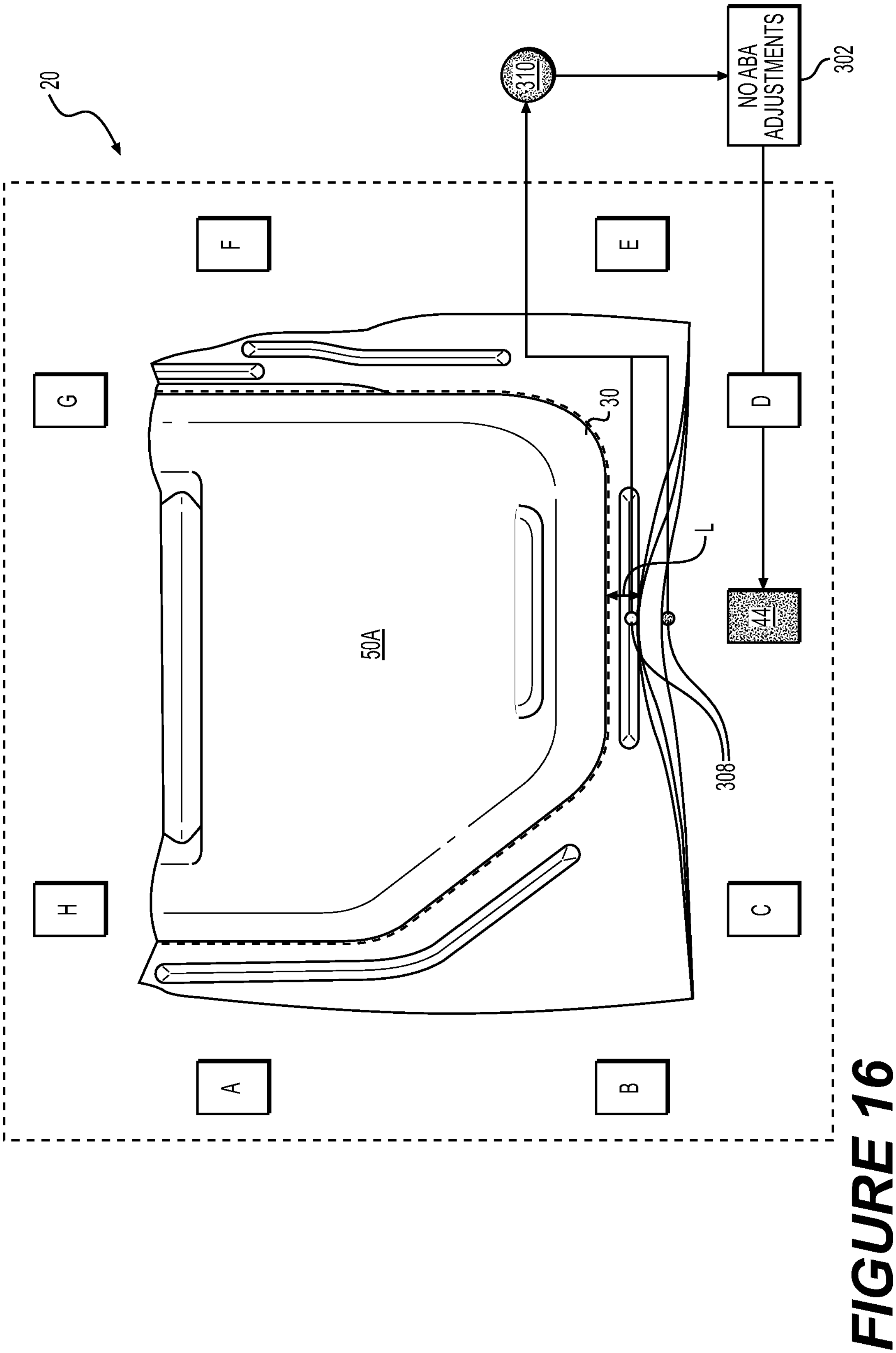
FIG. 16 is a schematic top view illustrating placement of the adjustable block assembly and a draw-in sensor relative to a first part during a stamping process in accordance with one aspect of the disclosure.
Figure 17:
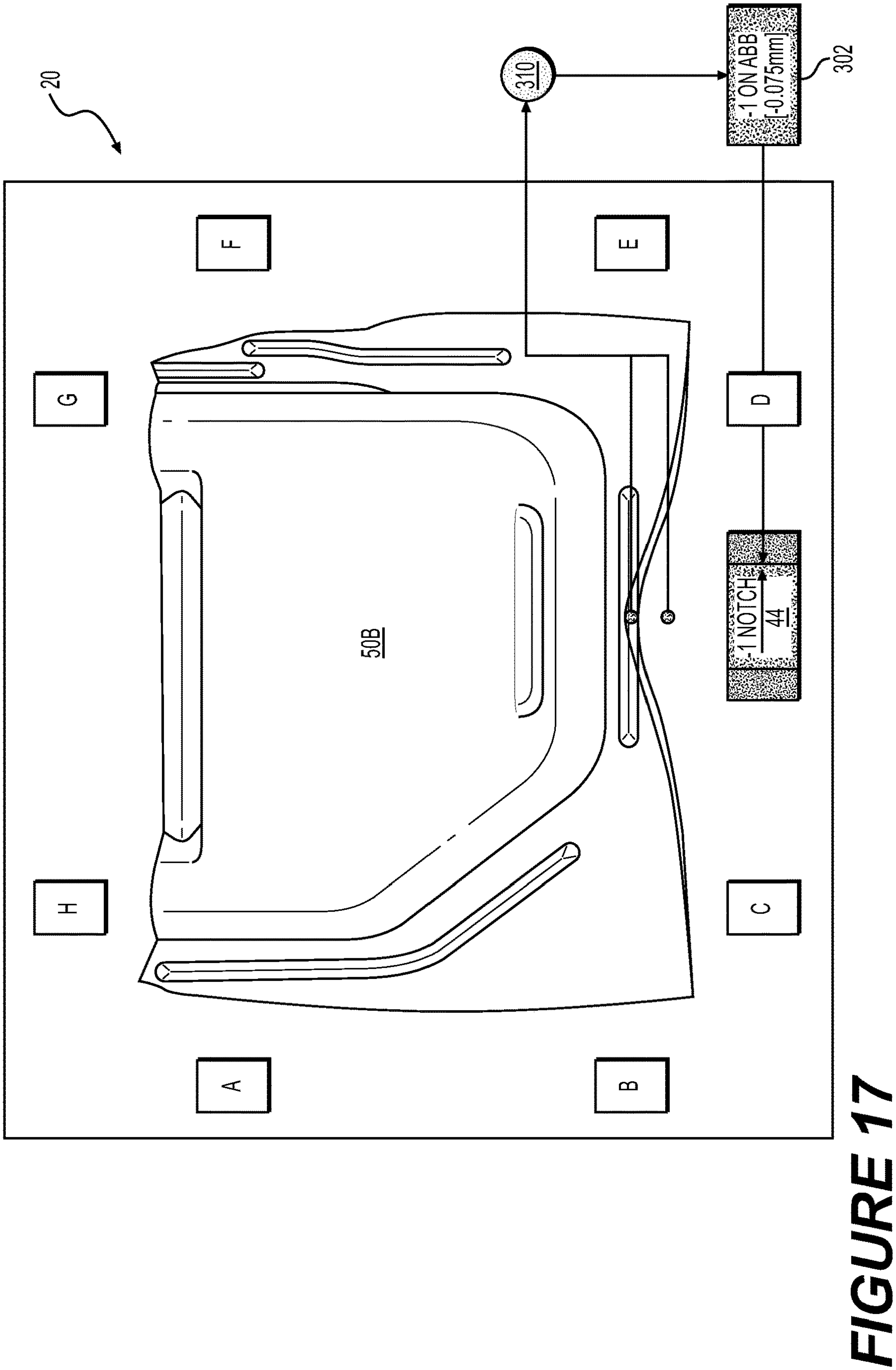
Figure 18:
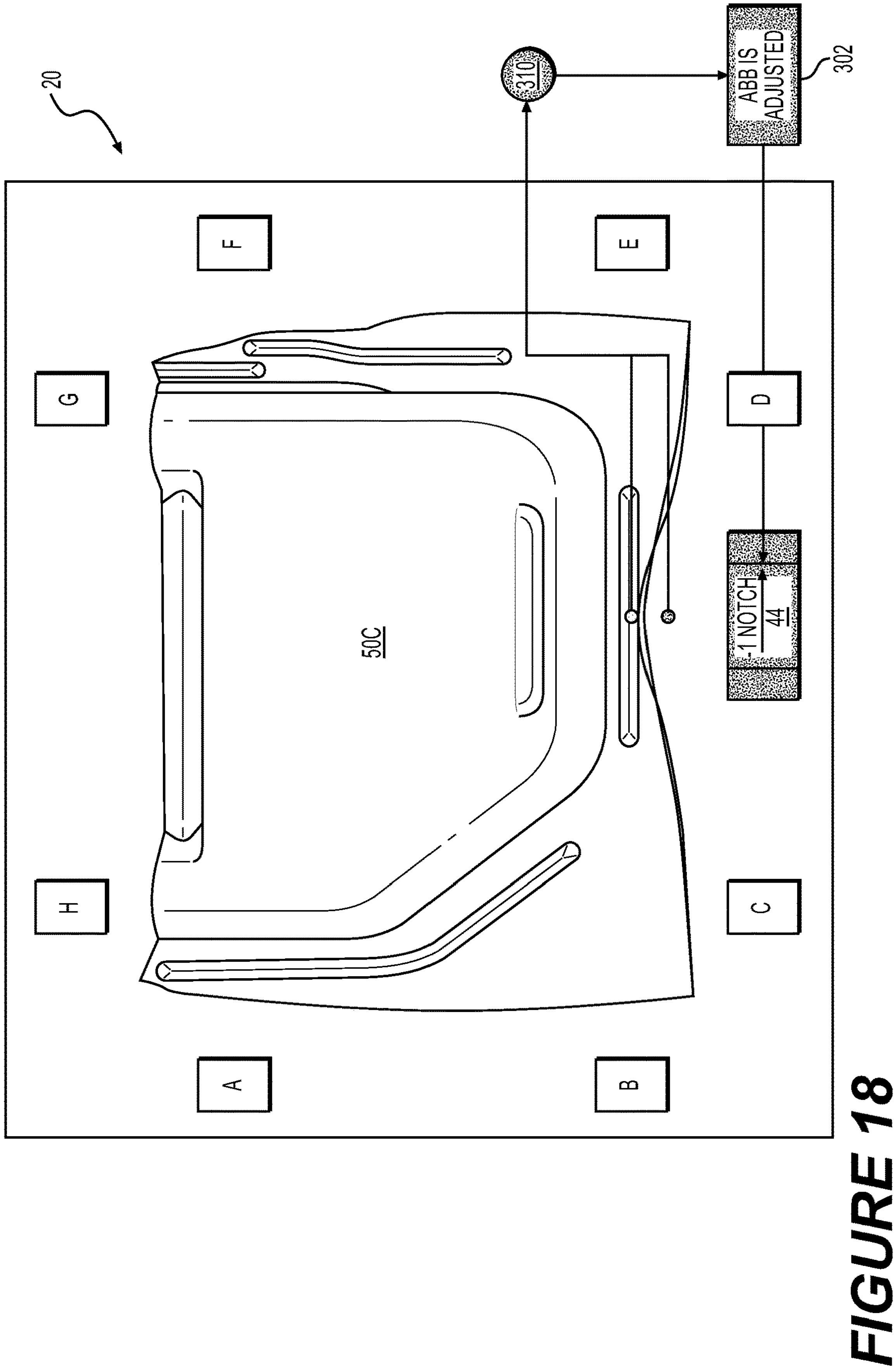
Figure 19:
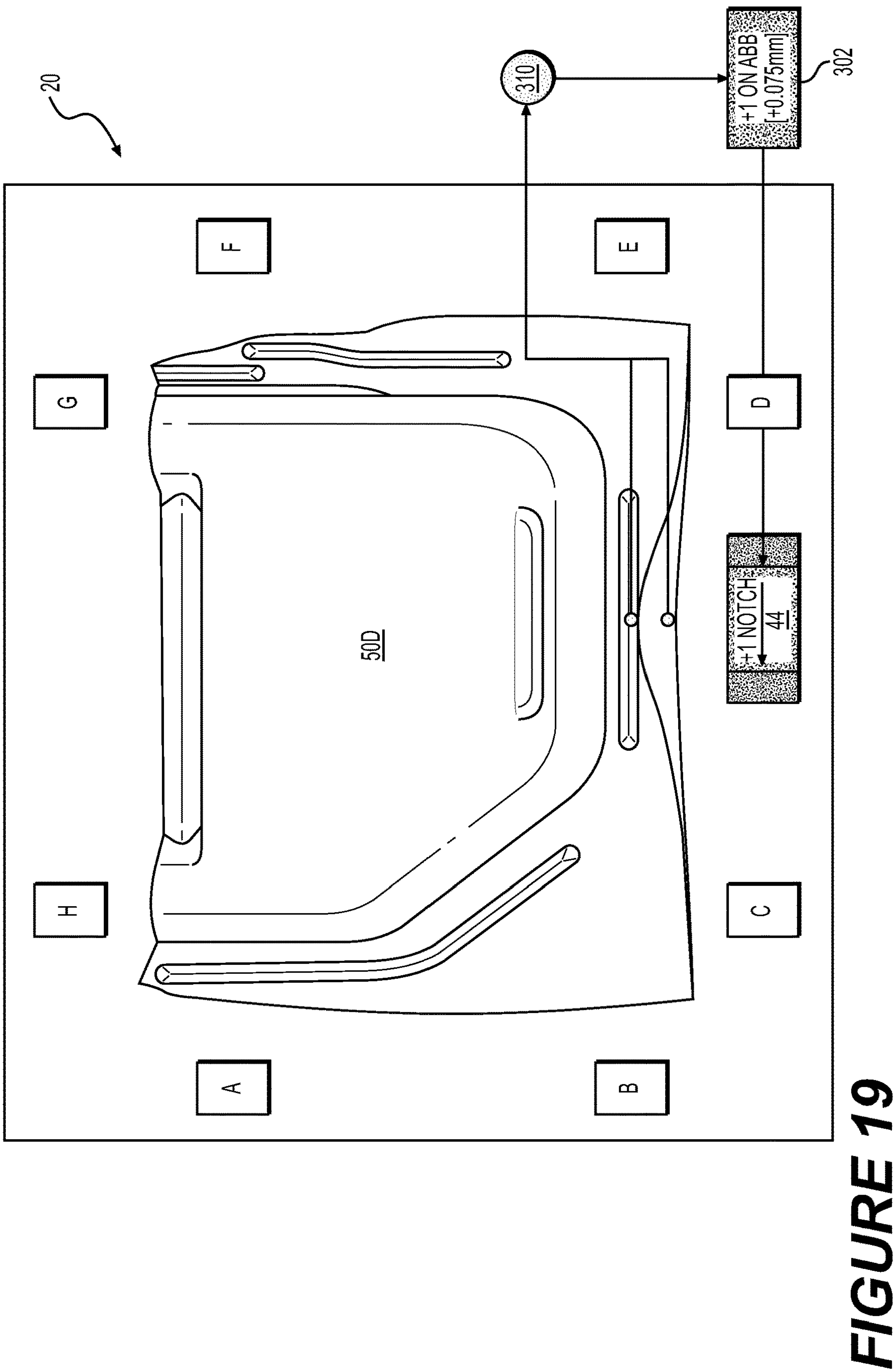
Figure 20:
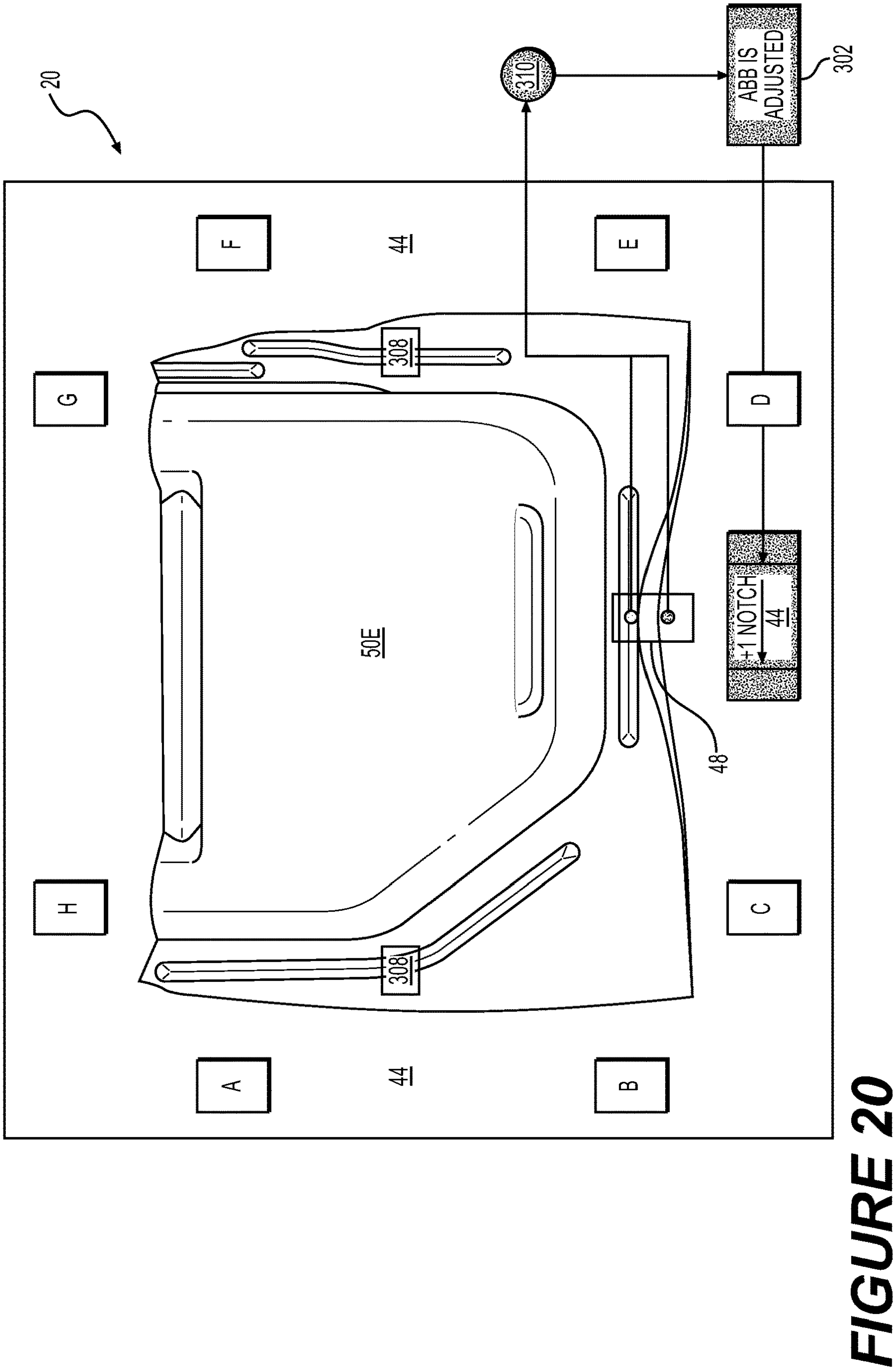

Referring initially to FIG. 16, a pair of draw-in sensors 308 and the adjustable block assembly 44 are located between locations A and B. An outline of the forming cavity 30 is shown in dashed lines. The flange length L of part 50A is measured via the draw-in sensors 308 and relayed to a user interface 310 indicating an acceptable amount of draw-in. In FIG. 17, the flange length L of part 50B is measured via the draw-in sensors 308 and relayed to a user interface 310 indicating that the amount of draw-in needs to be reduced via an increase in the vertical extension D of the adjustable block assembly 44. In FIG. 18, the flange length L of part 50C is measured via the draw-in sensors 308 and relayed to a user interface 310 indicating an acceptable amount of draw-in resulting from the suggested adjustments to decrease draw-in from FIG. 17. In FIG. 19, the flange length L of part 50D is measured via the draw-in sensors 308 and relayed to a user interface 310 indicating that the amount of draw-in needs to be increased via a decrease in the vertical extension D of the adjustable block assembly 44. In FIG. 20, the flange length L of part 50E is measured via the draw-in sensors 308 and relayed to a user interface 310 indicating an acceptable amount of draw-in resulting from the suggested adjustments to increase draw-in from FIG. 19. In some embodiments, the user interface 310 includes at least one light associated with each adjustable block assembly 44 and displays a green illumination during an acceptable amount of draw-in (within a predefined range) as measured from sensors 308 and displays a red illumination once the amount of draw-in is either too low or too high. As such, in embodiments wherein there is a plurality of adjustable block assemblies 44 (see FIG. 19), sensors 308, and lights of the user interface 310 may be equal in number and located adjacently to each of the adjustable block assemblies 44.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, unless otherwise indicated, usages of the terms top, upper, lower, left, and right are not to be construed as limiting. For example, in arrangements wherein an element is referenced as top does not limit the disclosure to the element being oriented upwardly during operation. Similarly, in arrangements wherein an element is referenced as lower does not limit the disclosure to the element being oriented downwardly during operation.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A stamp tool assembly comprising:

a forming cavity;

a first draw-in surface and a second draw-in surface adjacent to the forming cavity and defining a space therebetween; and at least one adjustable block assembly comprising:

a top plate including a bottom surface defining a plurality of top plate teeth;

a lower plate including a top surface defining a plurality of lower plate teeth sized to interlock with the top plate teeth;

a base plate connected to the top plate with at least one fastener;

the lower plate being sandwiched between the top plate and the base plate;

the lower plate moveable with respect to the top plate for interlocking respective teeth between a plurality of settings; and wherein at least one of the top plate and the lower plate includes a body that is inclined.

2. The stamp tool assembly of claim 1, wherein the stamp tool assembly further includes at least one draw-in sensor for measuring the amount of material from a provided blank retained between the first draw-in surface and the second draw-in surface.

3. The stamp tool assembly of claim 1, wherein the at least one adjustable block assembly includes a plurality of adjustable block assemblies spaced around the forming cavity.

4. The stamp tool assembly of claim 3 wherein the at least one draw-in sensor includes a plurality of draw-in sensors and each adjustable block assembly includes a draw-in sensor located adjacently thereto.

5. The stamp tool assembly of claim 1, wherein the at least one adjustable block assembly further comprises:

a memory; and a processor, wherein the memory includes instructions that, when executed by the processor, cause the processor to: generate a threshold reading of the at least one draw-in sensor between an upper control limit and a lower control limit; receive at least one reading from the at least one draw-in sensor; and adjust the setting of the adjustable block assembly when the at least one received reading is outside of the threshold reading.

6. The stamp tool assembly of claim 5, wherein the at least one adjustable block assembly includes a plurality of adjustable block assemblies spaced around the forming cavity, and wherein the processor is further caused to identify at least one of the adjustable block assemblies associated with a reading outside of the threshold based on proximity of the identified adjustable block assembly to a location of the reading.

7. The stamp tool assembly of claim 1, wherein the top plate includes a body that is inclined and the lower plate includes a body that is inclined in an opposite direction from the body of the top plate.

8. The stamp tool assembly of claim 1, wherein the top plate includes a top surface and the lower plate includes a lower surface, wherein the top surface and the lower surface are parallel in the plurality of settings.

9. The stamp tool assembly of claim 1, wherein the lower plate defines an elongated cavity that at least one of the at least one fastener extends through and wherein the elongated cavity is sized to permit the lower plate to travel with respect to the top plate, the at least one fastener, and the base plate.

10. The stamp tool assembly of claim 1, wherein the adjustable block assembly includes an actuator that moves the top plate relative to the lower plate.

* * * * *